Jan. 19, 1971  R. MOHR  3,555,784
SEPARATING AMMONIA FROM OFFGAS OBTAINED
IN THE SYNTHESIS OF MELAMINE
Filed Dec. 2, 1968
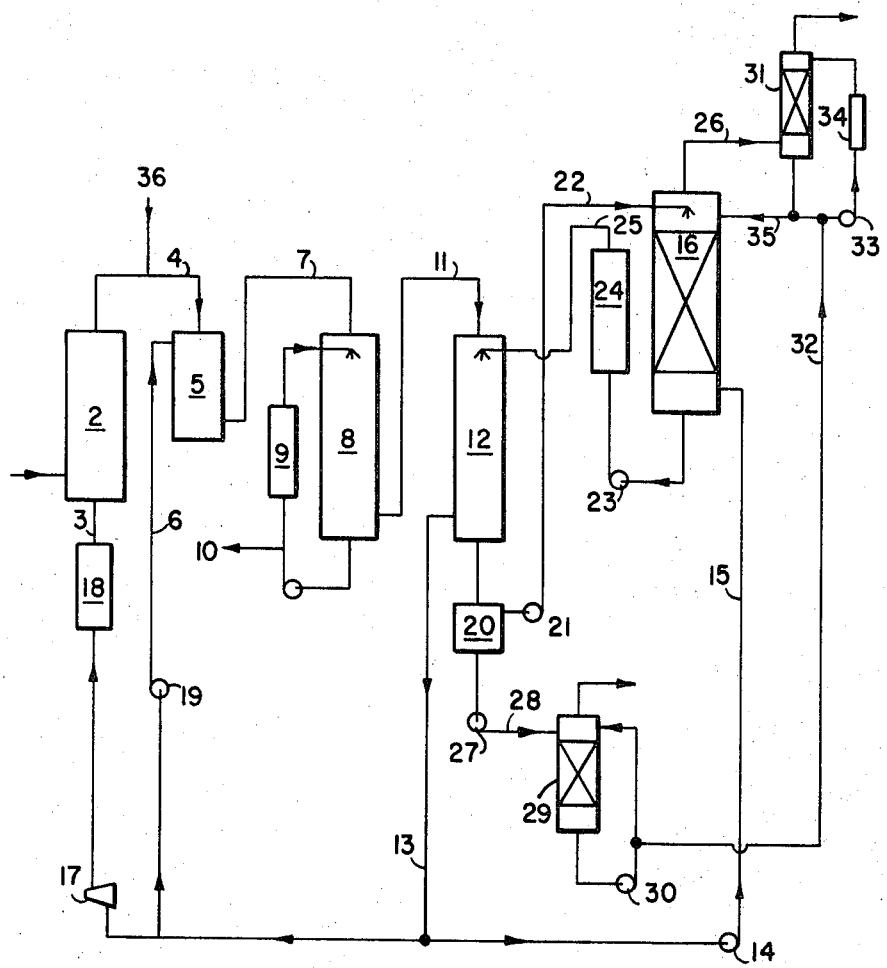
INVENTOR.
RUDOLF MOHR
BY Maryall, Johnston, Cook & Root

3,555,784
SEPARATING AMMONIA FROM OFFGAS OBTAINED IN THE SYNTHESIS OF MELAMINE
Rudolf Mohr, Lampertheim, Germany, assignor to Badische Anilin- & Soda-Fabrik Aktiengesellschaft, Ludwigshafen (Rhine), Germany
Filed Dec. 2, 1968, Ser. No. 780,357
Claims priority, application Germany, Dec. 1, 1967, 1,670,290
Int. Cl. B01d 19/00
U.S. Cl. 55—70         4 Claims

ABSTRACT OF THE DISCLOSURE

To separate ammonia from offgas obtained in the synthesis of melamine from urea, the offgas, after melamine has been separated, is treated with a melt which contains ammonium nitrate and/or ammonium thiocyanate and/or urea. Temperatures which are between the boiling point of ammonia and the decomposition temperature of ammonium carbamate are maintained in the treatment.

---

It is known that urea can be converted into melamine in the presence of ammonia and catalysts at atmospheric or superatmospheric pressure at temperatures of from 320° to 450° C. As a rule about 2 to 5 m.$^3$ (STP) of ammonia has to be used per kilogram of urea. An offgas is formed according to the equation:

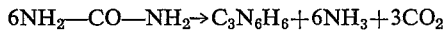
$$6NH_2\text{—}CO\text{—}NH_2 \rightarrow C_3N_6H_6 + 6NH_3 + 3CO_2$$

The offgas contains 1 mole of melamine, 6 moles of ammonia and 3 moles of carbon dioxide as well as the ammonia added. Melamine is condensed from this offgas by cooling to a temperature of from 150° to 250° C. Unreacted urea which has been entrained from the reaction zone with the offgas can be condensed out in a further cooling stage, generally by cooling to a temperature of from 120° to 140° C.

The offgas obtained consists mainly of ammonia together with carbon dioxide and small amounts of inert gases; its usability is considerably impaired by the carbon dioxide content.

In principle it is possible to supply this offgas after it has been reheated to the reactor as fluidizing gas. A high content of carbon dioxide however impairs the conversion of urea to melamine and is also unfavorable from the point of view of energy consumption because of the necessity of cooling and reheating large quantities of gas.

It is known that in order to separate the excess ammonia from this offgas the latter can be scrubbed with water in a column so that almost all the carbon dioxide and some of the ammonia are absorbed. Ammonia containing water vapor is thus obtained and this has to be dried before being reused for example as fluidizing gas in the melamine reactor. This may be done for example by cooling the gas mixture in condenser to temperatures as low as —6° C. For this reason the method is very expensive as regards energy consumption.

It is furthermore known from U.S. patent specification No. 2,950,173 that ammonia can be separated from melamine synthesis offgas by treatment with an anhydrous solvent, for example dimethyl formamide, ethylene glycol or diethylene glycol, so that at the same time a suspension of ammonium carbamate in the solvent is obtained. The temperature of the solvent is kept at from 0° to 20° C. The ammonium carbamate is separated from the solvent and split, by heating at about 100° C., into ammonia and carbon dioxide from which solvent which has been discharged together with the moist carbamate must be removed by condensation. Moreover, cooling brine has to be used for cooling the liquid.

We have now found that the separation of ammonia from offgas from the synthesis of melamine (from which melamine and, if desired, unreacted urea have been separated by cooling) by scrubbing the offgas with liquids and separating the suspension of ammonium carbamate thus formed from the gaseous ammonia, can be carried out advantageously by a process wherein the offgas is scrubbed, while maintaining a temperature above the boiling point of ammonia and below the decomposition temperature of ammonium carbamate, with a melt which contains ammonium nitrate and/or ammonium thiocyanate with or without urea and which is at least saturated with ammonia at the temperature in question.

In this method, carbon dioxide is absorbed in the melt and a dry ammonia gas is obtained direct, which may for example be immediately introduced as fluidizing gas into the melamine reactor.

Melts of ammonium nitrate or ammonium thiocyanate which are saturated with ammonia have low solidification points. This is also true of the abovementioned mixtures of urea and ammonium thiocyanate or ammonium nitrate which form eutectics having very low melting points. For example the eutectic of 55% by weight of ammonium thiocyanate and 45% by weight of urea melts at 29° C., the eutectic of 46% by weight of urea and 54% by weight of ammonium nitrate at 46° C. and the eutectic of 25% by weight of ammonium nitrate, 30% by weight of ammonium thiocyanate and 45% by weight of urea melts at a temperature as low as 11° C. The melting point of the eutectic of ammonium nitrate and urea can be further lowered by adding potassium nitrate or sodium nitrate. Thus for example the eutectic of 44% by weight of urea, 50% by weight of ammonium nitrate and 6% by weight of potassium nitrate melts at 43° C. and the eutectic of 43% by weight of urea, 47% by weight of ammonium nitrate and 10% by weight of sodium nitrate melts at 35° C. The proportion of urea in the melts may be up to 140% by weight with reference to ammonium thiocyanate and ammonium nitrate.

It is not essential to use pure urea for the production of these mixtures; urea which contains up to 30% by weight of biuret may also be used. Urea, biuret and ammonium thiocyanate, when used in a composition of 50% by weight of urea, 10% by weight of biuret and 40% by weight of ammonium thiocyanate, give a eutectic which melts at 26° C.

The melting point of these mixtures thus depends to a great extent on their composition. In general those mixtures are suitable for carrying out the process according to this invention which contain up to 140% by weight of urea with reference to the ammonium nitrate and/or ammonium thiocyanate contained therein.

The scrubbing of the melt is carried out at a temperature above the boiling point of ammonia, which is —33.5° C. at atmospheric pressure, and below the decomposition temperature of ammonium carbamate, which is 60° C. at atmospheric pressure. The process is preferably carried out at a temperature of from 20 to 60° C. at atmospheric pressure. If superatmospheric pressure is used, correspondingly higher temperatures must be chosen. In any case, the preferred temperature range lies between the decomposition temperature of the ammonium carbamate at the pressure used and the temperature 40° C. below the decomposition temperature.

When using melts in accordance with this invention for scrubbing offgas from the synthesis of melamine, ammonia is dissolved in the melts and their melting point is further depressed thereby. In carrying out the process according to this invention the melt saturated with ammonia may be adapted to suit the operating temperature and operating pressure used. Particularly when using the abovementioned mixtures containing ureas the said molten mixtures may however also be directly supplied to the scrubbing zone so that they become saturated with ammonia.

The heat of condensation and the heat to be withdrawn to cool the offgas (which may be for example at a temperature of from 60° to 210° C.) may be removed for example in watercooled tube coolers. Since crystals of carbamate are deposited on the cooler walls during the cooling, it is advantageous to use a plurality of coolers arranged in parallel which are cleaned periodically.

According to a preferred embodiment of the invention, heat is removed by direct cooling with evaporating ammonia. For this the procedure may be that the amount of ammonia dissolved in the mixtures of urea and ammonium salt(s) is more than is necessary for saturation at the operating temperature and pressure used and this melt-super-saturated with ammonia is passed into the scrubbing zone. Excess ammonia evaporates therein and in this way removes heat without any risk of deposits being formed.

It has been found that surprisingly the evaporation enthalpy of ammonia from the melts according to this invention is very high. Thus for example the evaporation enthalpy of ammonia from a melt of 40 parts by weight of urea and 60 parts by weight of ammonium thiocyanate saturated at 40° C. and 760 mm. Hg is 7.2 kcal. per mole of ammonia, whereas the evaporating enthalpy of ammonia at 40° C. is merely 4.5 kcal. per mole.

The following Table 1 shows the ammonia vapor pressure at 40° C. over solutions of ammonia in a melt of urea and ammonium thiocyanate which contains a mixture of amomnium thiocyanate and urea in the weight ratio 3:2, in dependence on the ammonia content.

TABLE 1

| Percentage by wt. of $NH_3$: | $NH_3$ vapor pressure (mm. Hg) |
|---|---|
| 6 | 210 |
| 10 | 310 |
| 16 | 730 |
| 18 | 950 |
| 20 | 1180 |

Table 2 shows the vapor pressure in dependence on temperature in the same melt at a constant ammonia content of 16% by weight:

TABLE 2.—16% BY WEIGHT OF AMMONIA

| Temperature in ° C.: | Ammonia vapour pressure in mm. Hg |
|---|---|
| 20 | 365 |
| 30 | 523 |
| 40 | 732 |
| 50 | 1039 |

Treatment of the offgas is advantageously carried out in a falling-film absorber whose walls are flushed by the melt so that the carbamate formed cannot accumulate on the wall of the apparatus but is immediately absorbed by the melt or suspension. Some of the solution may be sprayed into the absorber in order to effect intense heat exchange and thus rapid cooling of the gas. The gas may be passed cocurrent or countercurrent to the melt through the separator. It may also be afterwashed in a downstream packed column although this is usually not necessary.

Treatment according to this invention may be carried out either at atmospheric pressure or at superatmospheric pressure. The treatment is advantageously carried out at the pressure at which the reaction of the urea to form melamine has been carried out. The temperature depends on the pressure used. At 760 mm. Hg the treatment of the gas is advantageously carried out at temperatures of from 20° to 50° C.

The carbamate obtained in the form of a suspension has a particle size of about 50 to 500 microns and may be extensively separated from the melt by sedimentation. The supernatant almost clear melt may be returned without filtration to the separator. It may however very easily be further clarified in a liquid cyclone or a filter.

The separated concentrated carbamate suspension, which contains about 35 to 60% by weight of carbamate, is supplied to a decomposer. The solid carbamate is advantageously not separated from the melt, on account of the better heat transfer, and decomposed at from 65° to 90° into ammonia and carbon dioxide. The melt freed from ammonium carbamate in this way may also be returned to the process.

Those parts of apparatus which come into contact with melts in accordance with this invention are advantageously enamelled or coated with rubber or plastics if the apparatus is not made of corrosion resistant materials. This may be dispensed with when using apparatus prepared from corrosion resistant materials, for example aluminum devoid of copper, aluminum-magnesium alloys, titanium, ferrosilicon or carbon materials.

A plant for the production of melamine is shown by way of example in the drawing, in which ammonia is separated from offgas by the method according to this invention.

311 kg. per hour of molten urea containing biuret is supplied through line 1 to a fluidized-bed reactor 2. During the same period 603 m.³ (STP) of ammonia which contains 0.5% by volume of carbon dioxide is supplied through line 3. The ammonia serves to fluidize the catalyst consisting of aluminum dioxide which is situated in the reactor. The urea introduced is converted to the extent of 98% into melamine at a temperature of 380° C. and at atmospheric pressure.

The offgas containing melamine, which is at about 320° C., is passed through line 4 to a separator 5 where it is cooled by being mixed with 920 m.³ (STP) of ammonia (supplied through line 6) which is at 40° C. and which contains 0.5% by volume of carbon dioxide and 0.9% by volume of inert gases, and thus brought to a temperature of 210° C. so that 100 kg. per hour of 99.5% melamine is desublimed.

The offgas freed to the extent of about 98% from melamine is supplied through line 7 to a column 8 in which it is scrubbed with a urea melt containing biuret at a temperature of from 130° to 140° C. for removal of residual melamine and unreacted urea. The melt is recycled and the heat absorbed is withdrawn in a cooler 9. Urea can be discharged from the system through line 10.

The offgas, which has a temperature of 138° C. and contains 3.6% by volume of carbon dioxide and 0.9% by volume of inert gas (nitrogen) in addition to 95.0% by volume of ammonia, is supplied through line 11 to a carbamate separator 12, where the offgas is scrubbed at about atmospheric pressure and a temperature of 40° C. with 47 m. (STP) per hour of a melt which is at a temperature of 45° C. and contains 46.0% by weight of ammonium thiocyanate, 30.5% by weight of urea,18.6% by weight of amomnia and 4.8% by weight of carbon dioxide. In relation to the temperature of 40° C. and the pressure, this melt contains about 1.65% more ammonia than corresponds to the equilibrium.

The carbamate which separates is suspended in the melt and the heat liberated is removed by ammonia evaporating from the melt.

2518 m.³ (STP) per hour of gaseous ammonia having a residual content of 0.2 to 0.5% by volume of carbon dioxide and 0.4 to 1.0% by volume of inert gas is withdrawn through line 13. Of this, about 995 m.³ (STP) is compressed by means of a blower 14 to 0.6 to 0.7 atmosphere gauge and supplied through line 15 to an ammonia absorber 16. 603 m.³ (STP) of ammonia is returned to the melamine reactor through a compressor 17 and a heat exchanger 18. The remaining 920 m.³ (STP) of ammonia is supplied (as described above) through blower 19 and line 6 to the melamine separator 5.

The melt containing carbamate is withdrawn at the base of the separator 12 and passes into a settling tank 20. From this, 46 m.³ per hour of the supernatant and clarified melt is returned continuously by means of a pump 21 through line 22 to the above mentioned ammonia absorber 16 and saturated there at 45° C. and the pressure prevailing therein (which is higher than that prevailing in the carbomate separator 12) with ammonia supplied through line 15. The melt treated with ammonia is withdrawn by means of a pump 23 and passed into a cooler 24 where the heat of absorption is withdrawn. The melt saturated with ammonia (which has the above mentioned composition) is supplied through line 25 to the carbamate separator 12.

A suspension containing 40% by weight of ammonium carbamate is withdrawn at the bottom of the settling tank 20 by means of a pump 27 and passed through line 28 into the carbamate decomposer 29. The ammonium carbamate is decomposed therein at a temperature of 75° C. and the melt freed from carbamate is recycled by means of a pump 30. At the top of the decomposer, 194 m.³ (STP) per hour of offgas containing 72% by volume of ammonia and 28% by volume of carbon dioxide is removed from the process through an air lock and may be processed for example into fertilizers, for example ammonium sulfate, or may be used as starting material for the synthesis of urea.

The gas (80% by volume of ammonia and 20% by volume of inert gas) removed through an air lock from the top of the ammonia absorber 16 through line 26 in an amount of 20 m.³ (STP) per hour is supplied (to utilize its ammonia content) to an absorber 31 and treated therein at 0.6 to 0.7 atmosphere gauge and 30° C. with a melt of urea and ammonium thiocyanate supplied through line 32 from the decomposer 29 in an amount of 320 kg./hour. The melt is recycled through a pump 33 and a cooler 34 where its heat is withdrawn. 5.5 m.³ (STP) per hour of a gas containing 73% by volume of inert gas and 27% by volume of ammonia is removed at the top of the absorber 31. The melt laden with ammonia is returned to the process through line 35.

About 35 m.³ (STP) of ammonia is supplied through line 36 to make up for the ammonia lost in the plant, mainly through the offgas.

The invention is illustrated by the following examples.

EXAMPLE 1

A mixture of 45% by weight of urea and 55% by weight of ammonium thiocyanate is saturated with ammonia and carbon dioxide at 12° C. The liquid mixture formed is fed into the top of a packed column having a width of 24 mm. and a height of 2 meters which is filled with 8 mm. Raschig rings. 320 liters (STP) of gas consisting of 93% by volume of ammonia and 7% by volume of carbon dioxide is passed per hour into the column and scrubbed with 15 to 20 liters of the above-mentioned mixture per hour. 253 liters per hour of ammonia having a carbon dioxide content of 0.004% by volume is withdrawn at the top of the column. The suspension containing ammonium carbamate is cooled in an aluminum cooler to 12° C. and then the ammonium carbamate is filtered off. The filtered solution is returned to the column.

EXAMPLE 2

A mixture consisting of 45% by weight of urea, 25% by weight of ammonium nitrate and 30% by weight of ammonium thiocyanate is saturated at 15° C. with ammonia and carbon dioxide. As described in Example 1, 320 liters (STP) of gas consisting of 93% by volume of ammonia and 7% by volume of carbon dioxide is fed per hour into the column and scrubbed with the above-mentioned mixture at 15° C. 253 liters (STP) per hour of ammonia having a carbon dioxide content of 0.005% by volume is withdrawn at the top of the column.

EXAMPLE 3

As described in Example 1, 320 liters (STP) per hour of gas consisting of 93% by volume of ammonia and 7% by volume of carbon dioxide is scrubbed with a mixture of 25% by weight of urea and 75% by weight of ammonium nitrate, which is saturated with ammonia and carbon dioxide at 35° C. 253 liters (STP) per hour of ammonia having a carbon dioxide content of 0.05% by volume is obtained.

EXAMPLE 4

320 liters (STP) per hour of a gas mixture which has a temperature of 180° C. and consists of 95% by volume of ammonia, 4.8% by volume of carbon dioxide and 0.2% by volume of cyanuric acid is scrubbed at 45° C. in the column described in Example 1 with a melt consisting of 55% by weight of urea and 45% by weight of ammonium thiocyanate, which is saturated with ammonia and carbon dioxide at 45° C. 274 liters (STP) of ammonia having a carbon dioxide content of 0.9% by volume is obtained per hour. The suspension containing carbamate passes into a settling tank in which the carbamate settles. The supernatant clear melt is cooled in an aluminum cooler to 42° C. and returned to the top of the column.

The moist carbamate separated is supplied to a decomposer in which a melt having a temperature of 75° C. and consisting of 45 parts by weight of ammonium thiocayanate and 55% by weight of urea, which is saturated with ammonia and carbon dioxide, is pumped in circulation. 43 liters (STP) of offgas consisting of 67% by volume of ammonia and 33% by volume of carbon dioxide is obtained To maintain an almost constant urea content there is removed from the scrubbing cycle through an air lock every twenty hours 250 ml of melt consisting of 44.8% by weight of urea, 35.2% by weight of ammonia thiocyanate, 15% by weight of ammonia and 5% by weight of carbon dioxide, which is cooled to 23° C. 34 g. of urea and 11 g. of carbamate are precipitated, which are separated. The melt is returned to the scrubbing cycle.

EXAMPLE 5

2 kg. of ammonium nitrate is dissolved in 2 liters of liquefied ammonia at −33° C. The solution is gradually heated to 25° C. and the excess ammonia evaporated. The melt which still contains 21% by weight of ammonia is circulated by pumping in the column described in Example 1.

320 liters (STP) of a gas mixture consisting of 95% by volume of ammonia and 5% by volume of carbon dioxide is introduced per hour into the column. 274 liters (STP) per hour of ammonia having a carbon dioxide content of 0.05% by volume is obtained.

EXAMPLE 6

Ammonium thiocyanate is liquefied by passing gaseous ammonia over it at a temperature of 60° C. After the melt has been saturated with ammonia and carbon dioxide it is introduced into the column described in Example 1 and recycled through a cooler. The temperature of the melt is kept at 40° C. 310 liters (STP) per hour of a gas mixture consisting of 97% by volume of ammonia and 3% by volume of carbon dioxide is passed countercurrent to the melt, 284 liters (STP) of ammonia having a carbon dioxide content of 0.4% by volume is withdrawn at the top of the column.

EXAMPLE 7

A mixture of 50% by weight of urea, 45% by weight of ammonium nitrate and 5% by weight of potassium nitrate is fused at 60° C. Ammonia is passed into this melt which is cooled to 40° C. at the same time and is saturated at this temperature with ammonia and carbon dioxide.

315 liters (STP) of a gas mixture consisting of 95% by volume of ammonia and 5% by volume of carbon dioxide is passed per hour into the packed column described in Example 1 and scrubbed with the melt at a temperature of 40° C. 289 liters (STP) of ammonia having a carbon dioxide content of 0.5% by volume is obtained per hour.

I claim:
1. A process for separating ammonia from offgas which has been obtained in the synthesis of melamine, which has been freed from melamine and which consists essentially of carbon dioxide and ammonia, by scrubbing the offgas with a liquid and separating gaseous ammonia from the resulting suspension of ammonium carbamate in the liquid, wherein the offgas is scrubbed with a melt which contains ammonium nitrate, ammonium thiocyanate or a mixture thereof while maintaining a temperature which is higher than the boiling point of the ammonia and lower than the decomposition temperature of ammonium carbamate, said melt being at least saturated with ammonia at the maintained temperature.

2. A process as claimed in claim 1 wherein the melt contains urea.

3. A process as claimed in claim 1 wherein the melt contains up to 140% by weight of urea with reference to ammonium nitrate, ammonium thiocyanate or a mixture thereof.

4. A process as claimed in claim 2 wherein the urea contains up to 30% by weight of biuret.

References Cited

UNITED STATES PATENTS

| | | | |
|---|---|---|---|
| 2,812,829 | 11/1957 | Marullo et al. | 55—68X |
| 2,950,173 | 8/1960 | Baroni et al. | 55—70X |
| 3,312,525 | 4/1967 | Schmidt et al. | 55—70X |
| 3,321,603 | 3/1965 | Guenther et al. | 260—555 |
| 3,386,804 | 6/1968 | Neugebauer et al. | 55—70X |

SAMIH N. ZAHARNA, Primary Examiner

R. W. BURKS, Assistant Examiner